US012521684B2

(12) United States Patent
Hsieh

(10) Patent No.: US 12,521,684 B2
(45) Date of Patent: Jan. 13, 2026

(54) FINE BUBBLE GENERATOR SYSTEM

(71) Applicant: Dartpoint Tech. Co., Ltd., Taipei (TW)

(72) Inventor: Chung-Hsin Hsieh, Taipei (TW)

(73) Assignee: Dartpoint Tech. Co., Ltd., Taipei (TW)

( * ) Notice: Subject to any disclaimer, the term of this patent is extended or adjusted under 35 U.S.C. 154(b) by 300 days.

(21) Appl. No.: 18/338,416

(22) Filed: Jun. 21, 2023

(65) Prior Publication Data

US 2024/0189783 A1 Jun. 13, 2024

Related U.S. Application Data

(60) Provisional application No. 63/353,893, filed on Jun. 21, 2022.

(51) Int. Cl.
*B01F 23/2373* (2022.01)
*B01F 23/232* (2022.01)

(52) U.S. Cl.
CPC ...... *B01F 23/2373* (2022.01); *B01F 23/2323* (2022.01)

(58) Field of Classification Search
CPC ......................... B01F 23/2323; B01F 23/2373
USPC ........................................................... 261/28
See application file for complete search history.

(56) References Cited

U.S. PATENT DOCUMENTS 7,874,546 B2 * 1/2011 Park ........................ B01F 25/72 261/DIG. 74
2011/0156287 A1 * 6/2011 Tsai ...................... B01F 23/232 261/28
2015/0314248 A1 * 11/2015 Castellote ......... B01F 23/23105 261/36.1

FOREIGN PATENT DOCUMENTS

KR 1020060128761 A * 12/2006
KR 1020190031012 A * 3/2019

OTHER PUBLICATIONS

English Machine Translation of KR 1020060128761 A (Year: 2006).*
English Machine Translation of KR 1020190031012 A (Year: 2019).*

* cited by examiner

*Primary Examiner* — Charles S Bushey
(74) *Attorney, Agent, or Firm* — BACON&THOMAS,PLLC

(57) ABSTRACT

The invention relates to a fine bubble generator system, which has an air inlet port, a water inlet port, and a water outlet port, and includes a pump, an air inlet module, a water inlet module, and a control module. The pump has a pump inlet port and a pump outlet port. The air inlet module is connected between the air inlet port and the pump inlet port. The water inlet module is connected between the water inlet port and the pump inlet port. A first air-liquid tank and/or a second air-liquid tank, and a nozzle are connected in sequence between the pump outlet port and the water outlet port. The control module is electrically connected to the pump and the air inlet module, and is configured to control the pump to operate, and control the air inlet module to let air in from the air inlet port.

13 Claims, 11 Drawing Sheets

FINE BUBBLE GENERATOR SYSTEM

CROSS REFERENCE TO RELATED APPLICATION

This application claims the benefit of filing date of U.S. Provisional Application Ser. No. 63/353,893, entitled "MICRO BUBBLE GENERATOR SYSTEM ARCHITECTURE AND NOZZLE STRUCTURE" filed Jun. 21, 2022 under 35 USC § 119(e)(1).

BACKGROUND OF THE INVENTION

1. Field of the Invention

The present invention relates to a fine bubble generator system.

2. Description of Related Art

According to the diameters of bubbles, it is possible to define different types of bubbles. A "microbubble" refers to a bubble having its diameter greater than 1 μm and smaller than 100 μm. An "ultra-fine-bubble" or a "nano-bubble" (an old term) refers to a bubble having its diameter smaller than 1 μm. It is noted that, 1 micrometer (μm) is equal to one thousandth of millimeter (mm). Nowadays, "microbubbles" and "ultra-fine bubble" are collectively called "fine bubbles".

A fine bubble generator is mainly used to wash human bodies or pets, or clean objects, and it has a significant advantage in cleaning deep layers thereof. It is noted that, although there is a bathtub called bubble massage bathtub, what the bubble massage bathtub generates are big bubbles, so it belongs to another technical field different from the technical field of the present invention. A prior art bubble generator used for a bathtub includes a pump and a pressure tank. With the operation of the pump, the water can be suctioned from the water inlet port into the pipelines, and with the negative pressure come from the water flow, the air can be suctioned from the air inlet port into the water. Next, the water and the air will flow together into the pressure tank, and then the pressure tank mixes the water with the air and applies pressure onto them, such that the air is dissolved into the water, and they will be sent to the bathtub. Then, the bathtub will be filled in with milky-white bubble water. In the prior art bubble generator, the air and the water are flowing simultaneously, and it has a disadvantage that, it is difficult and even impossible to control the amount of air contained in the pressurized water, and as a result, when it is generating fine bubbles, there is a probability that it cannot generate fine bubbles efficiently because of insufficient amount of air.

SUMMARY OF THE INVENTION

The main principle of the present invention is to let the air from the air inlet port and the water from the water inlet port be suctioned into the pipelines by the operation of the pump respectively during different time intervals. The advantage of doing so is that, it can precisely control the respective suctioned amounts of air and water. For this purpose, in some embodiments, they introduce a valve controlling the air inflow (implemented by the first solenoid valve) and a valve controlling the water inflow (implemented by a direct control by the second solenoid valve or an indirect control by the first solenoid valve). By controlling these valves, it is possible to open the water channel while closing the air channel simultaneously, and then the pump can provide a "self-priming" function.

According to one aspect of the present invention, there is provided:

[1] A fine bubble generator system, which has an air inlet port, a water inlet port, and a water outlet port, and including a pump, an air inlet module, a water inlet module, and a control module. The pump has a pump inlet port and a pump outlet port. The air inlet module is connected between the air inlet port and the pump inlet port. The water inlet module is connected between the water inlet port and the pump inlet port. A first air-liquid tank and/or a second air-liquid tank, and a nozzle connected in sequence between the pump outlet port and the water outlet port. The control module is electrically connected to the pump and the air inlet module, and configured to control the pump to operate, and control the air inlet module to let air in from the air inlet port.

[2] Optionally or preferably, the air inlet module lets air in from the air inlet port during a first time interval, the water inlet module lets water in from the water inlet port during a second time interval, and the first time interval and the second time interval do not overlap.

[3] Optionally or preferably, the air inlet module includes a first check valve and a first solenoid valve connected in sequence between the air inlet port and the pump inlet port; the control module is electrically connected to the first solenoid valve, and configured to control the first solenoid valve to operate.

[4] Optionally or preferably, an auxiliary pipeline is arranged as a branch between the second air-liquid tank and the nozzle, the auxiliary pipeline includes a third solenoid valve, and is connected to an accelerating water outlet port; the control module is electrically connected to the third solenoid valve, and configured to control the third solenoid valve to operate.

[5] Referring to example [4], optionally or preferably, the third solenoid valve is configured to allow the auxiliary pipeline to be opened during an air inflow interval, so as to accelerate discharging water in the first air-liquid tank and/or the second air-liquid tank.

[6] Referring to example [4], optionally or preferably, the water inlet module includes a water inlet filter and a second solenoid valve connected in sequence between the water inlet port and the pump inlet port; the control module is electrically connected to the second solenoid valve, and configured to control the second solenoid valve to operate; the fine bubble generator system further includes a first flow switch, arranged in a pipeline between the pump outlet port and the first air-liquid tank; the control module is electrically connected to the first flow switch, and configured to receive an operating state of the fine bubble generator system from the first flow switch.

[7] Referring to example [4], optionally or preferably, the water inlet module includes a water inlet filter, a second solenoid valve, and a pipeline with a second flow switch arranged therein connected in sequence between the water inlet port and the pump inlet port; the control module is electrically connected to the second solenoid valve, and configured to control the second solenoid valve to operate; the control module is electrically connected to the second flow switch, and configured to receive an operating state of the fine bubble generator system from the second flow switch.

[8] Referring to example [7], optionally or preferably, the fine bubble generator system further includes a first water sensor, arranged in another pipeline between the pump outlet port and the first air-liquid tank, the first water sensor is a contact water sensor; the control module is electrically connected to the first water sensor, and configured to receive an operating state of the fine bubble generator system from the first water sensor.

[9] Referring to any of examples [6] to [8], optionally or preferably, the fine bubble generator system further includes a three-way pipe, which has a first port connected to an outlet port of the water inlet filter, a second port connected to an inlet port of the second solenoid valve, and a third port connected to the accelerating water outlet port.

[10] Referring to example [4], optionally or preferably, the water inlet module includes a water inlet filter, a second check valve, and a pipeline with a second flow switch arranged therein connected in sequence between the water inlet port and the pump inlet port; the control module is electrically connected to the second flow switch, and configured to receive an operating state of the fine bubble generator system from the second flow switch.

[11] Referring to example [10], optionally or preferably, the fine bubble generator system further includes a first water sensor, arranged in another pipeline between the pump outlet port and the first air-liquid tank, the first water sensor is a contact water sensor; the control module is electrically connected to the first water sensor, and configured to receive an operating state of the fine bubble generator system from the first water sensor.

[12] Referring to example [10], optionally or preferably, the fine bubble generator system further includes a second water sensor, adjacent to the pump outlet port or the first air-liquid tank, the second water sensor is a non-contact water sensor; the control module is electrically connected to the second water sensor, and configured to receive an operating state of the fine bubble generator system from the second water sensor.

[13] Referring to example [4], optionally or preferably, the water inlet module includes a water inlet filter and a second check valve connected in sequence between the water inlet port and the pump inlet port; the fine bubble generator system further includes a first flow switch, arranged in a pipeline between the pump outlet port and the first air-liquid tank; the control module is electrically connected to the first flow switch, and configured to receive an operating state of the fine bubble generator system from the first flow switch.

[14] Optionally or preferably, the fine bubble generator system is powered by a ground fault circuit interrupter (GFCI) power line; the control module is connected to the GFCI power line via a transformer; the control module includes a control panel.

Other objects, advantages, and novel features of the present invention will become more apparent from the following detailed description when taken in conjunction with the accompanying drawings.

DETAILED DESCRIPTION OF THE EMBODIMENT

Figure 1:
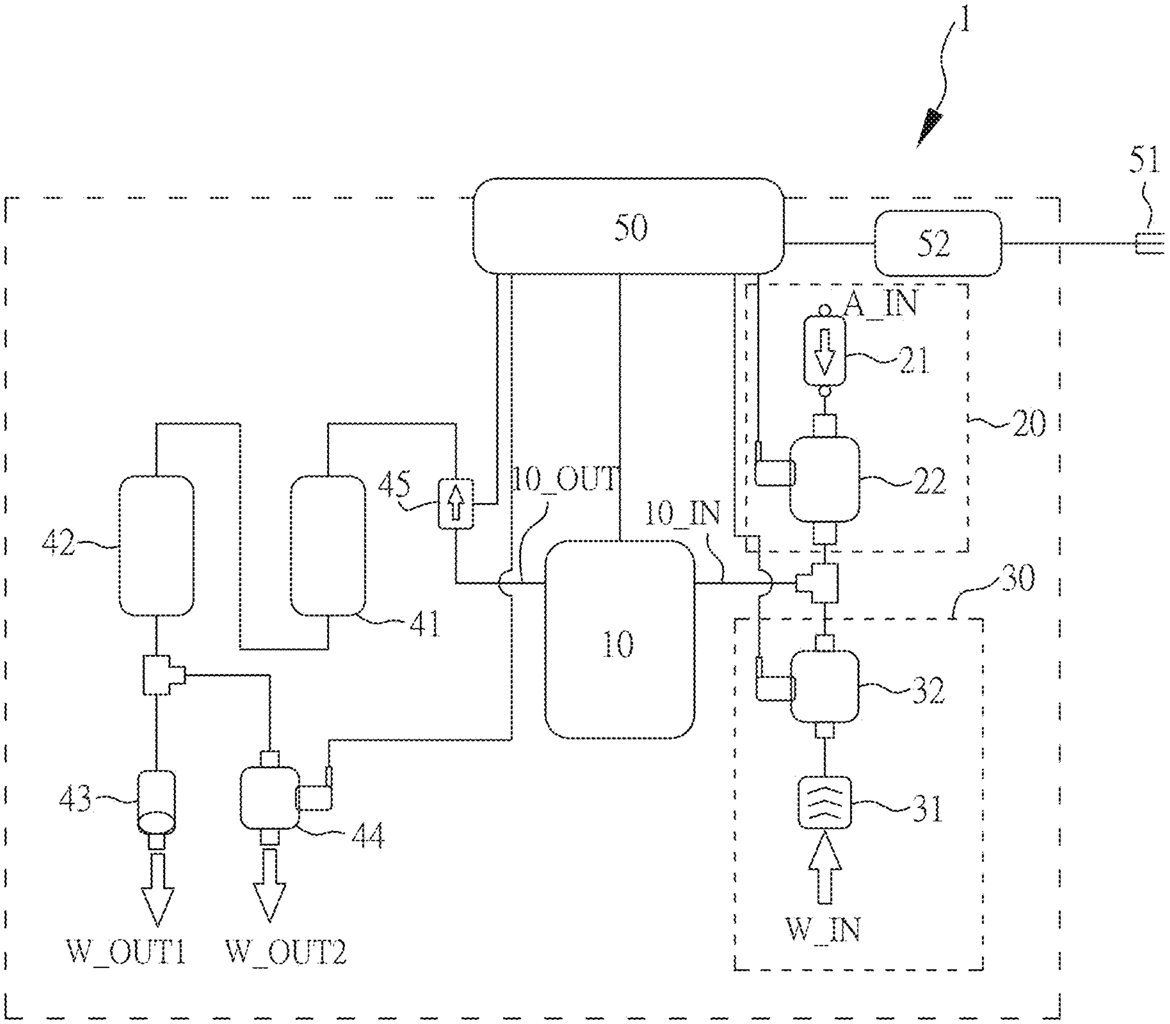
FIG. 1 is a systemic block diagram of the fine bubble generator system according to the first embodiment of the present invention.

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as “first” or “second”, are used to distinguish a plurality of elements having the same name, and it does not mean that there is essentially a level, a rank, an executing order, or a manufacturing order among the elements, except otherwise specified. A “first” element and a “second” element may exist together in the same component, or alternatively, they may exist in different components, respectively. The existence of an element described by a greater ordinal number does not essentially mean the existence of another element described by a smaller ordinal number.

In the present specification, a description saying a feature A “or” or “and/or” a feature B means that the feature A exist alone, the feature B exists alone, or the features A and B coexist; a description saying a feature A “and” a feature B means that the features A and B coexist; the terms, such as “comprise”, “include”, “have”, or “contain”, mean that “include but not limited thereto” except otherwise specified.

Moreover, in the present specification, the terms, such as “top”, “bottom”, “left”, “right”, “front”, “back”, or “middle”, as well as the terms, such as “on”, “above”, "under", "below", or "between", are used to describe the relative positions among a plurality of elements, and the described relative positions may be interpreted to include their translation, rotation, or reflection.

Moreover, in the present specification, when an element is described to be arranged "on" or "above" another element, it does not essentially mean that the elements contact the other element, except otherwise specified. Such interpretation is applied to other cases similar to the case of "under" or "below".

Moreover, in the present specification, the terms, such as "preferably" or "advantageously", are used to describe an optional or additional element or feature, and in other words, the element or the feature is not an essential element, and may be omitted in some embodiments.

Moreover, in the present specification, when an element is described to be "suitable for" or "adapted to" another element, the other element is an example or a reference helpful in imagination of properties or applications of the element, and the other element is not to be considered to form a part of a claimed subject matter; similarly, except otherwise specified; similarly, in the present specification, when an element is described to be "suitable for" or "adapted to" a configuration or an action, the description is made to focus on properties or applications of the element, and it does not essentially mean that the configuration has been set or the action has been performed, except otherwise specified.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, in the present specification, two elements may be electrically connected to each other directly or indirectly, except otherwise specified.

First Embodiment

Figure 8:
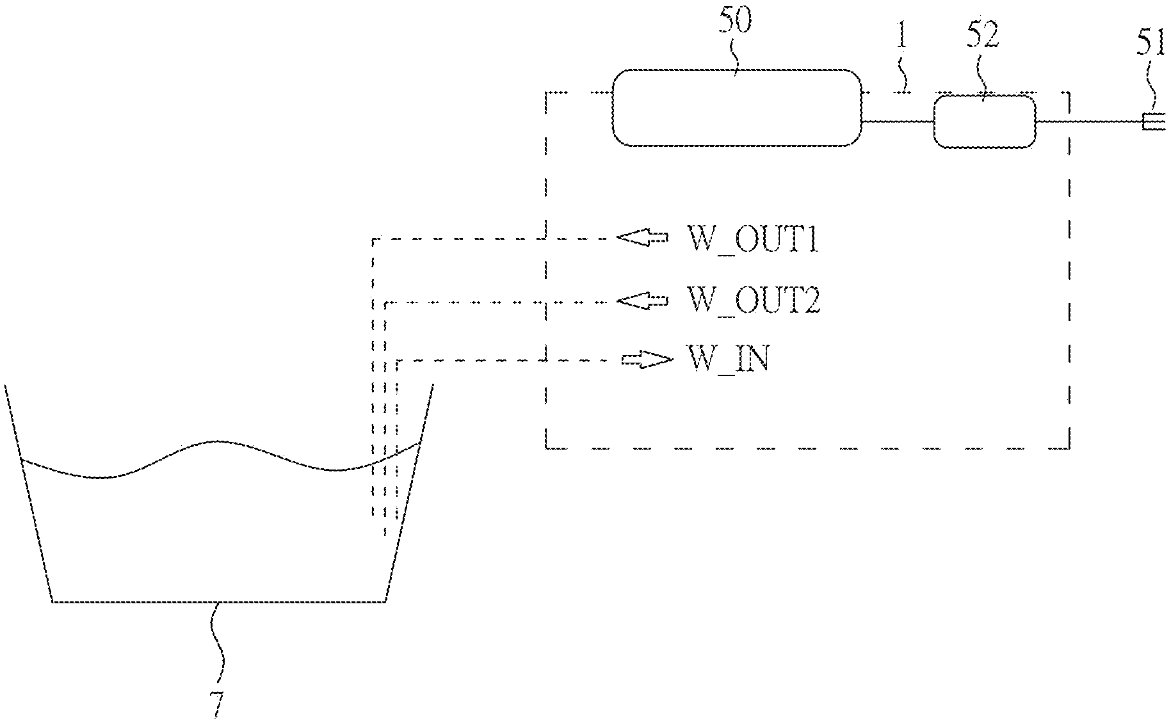
FIG. 8 is a schematic diagram showing the connection between the fine bubble generator system and the water container according to one application example of the present invention.

FIG. 1 is a systemic block diagram of the fine bubble generator system 1 according to the first embodiment of the present invention. As shown in FIG. 1, the fine bubble generator system 1 in the first embodiment of the present invention has an air inlet port A_IN, from which the air can enter into the fine bubble generator system 1, a water inlet port W_IN, from which the water can enter into the fine bubble generator system 1, and a water outlet port W_OUT1, via which the water containing fine bubbles can be discharged. Optionally or preferably, the fine bubble generator system 1 further has an accelerating water outlet port W_OUT2. It is noted that, the relation of the water inlet port W_IN, the water outlet port W_OUT1, and the accelerating water outlet port W_OUT2 with respect to a water container (for example, a bathtub) is illustrated in FIG. 8 and the relevant description. The air inlet port A_IN is not directly associated with the water container, and it may be arranged anyway as long as the air can enter into the fine bubble generator system 1.

Regarding the components thereof, the fine bubble generator system 1 includes a pump 10, which has a pump inlet port 10_IN and a pump outlet port 10_OUT, an air inlet module 20, a water inlet module 30, an air-liquid tank set, a nozzle 43, and the control module 50. The air-liquid tank set may include at least one first air-liquid tank 41, and may further include a second air-liquid tank 42, and may include more air-liquid tanks. In the following description, the air-liquid tank set is assumed to include the first air-liquid tank 41 and the second air-liquid tank 42, only for the purpose of simplicity, but not limited thereto. The pump 10 may be a diaphragm pump, but not limited thereto.

The structure of the fine bubble generator system 1 is illustrated as follows:

The air inlet module 20 is connected between the air inlet port A_IN and the pump inlet port 10_IN. The air inlet module 20 includes a first check valve 21 and a first solenoid valve 22 connected in sequence between the air inlet port A_IN and the pump inlet port 10_IN. The "check valve" in the present description is also known as a "non-return valve" or a "one-way valve", which only allows fluid such as air or liquid to flow in a one-way direction, but forbids the fluid to flow in an opposite direction. The check valve may be chosen from various suitable check valves commercially available, so the details are omitted here. The "solenoid valve" in the present description is a valve driven by a solenoid coil, and it opens or closes a pipeline according to power-on or power-off states of the solenoid coil. The solenoid valves may be chosen from various suitable solenoid valves commercially available, so the details are omitted here.

The water inlet module 30 is connected between the water inlet port W_IN and the pump inlet port 10_IN. The water inlet module 30 includes a water inlet filter 31 and a second solenoid valve 32 connected in sequence between the water inlet port W_IN and the pump inlet port 10_IN. The "filter" in the present description is used to remove foreign matters in the water from the water inlet port W_IN.

Figure 9:
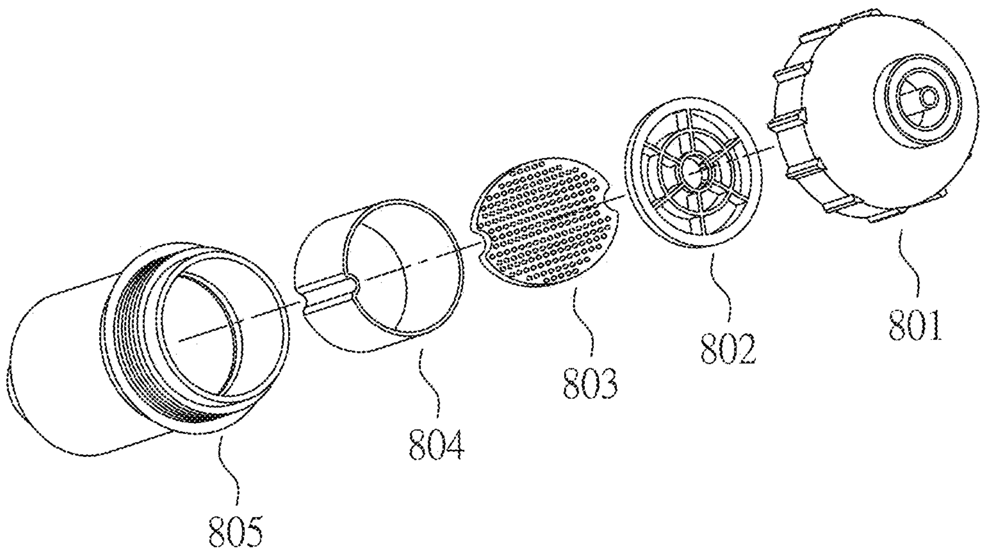
FIG. 9 is an exploded view of the air-liquid tank according to one embodiment of the present invention.
Figure 10:
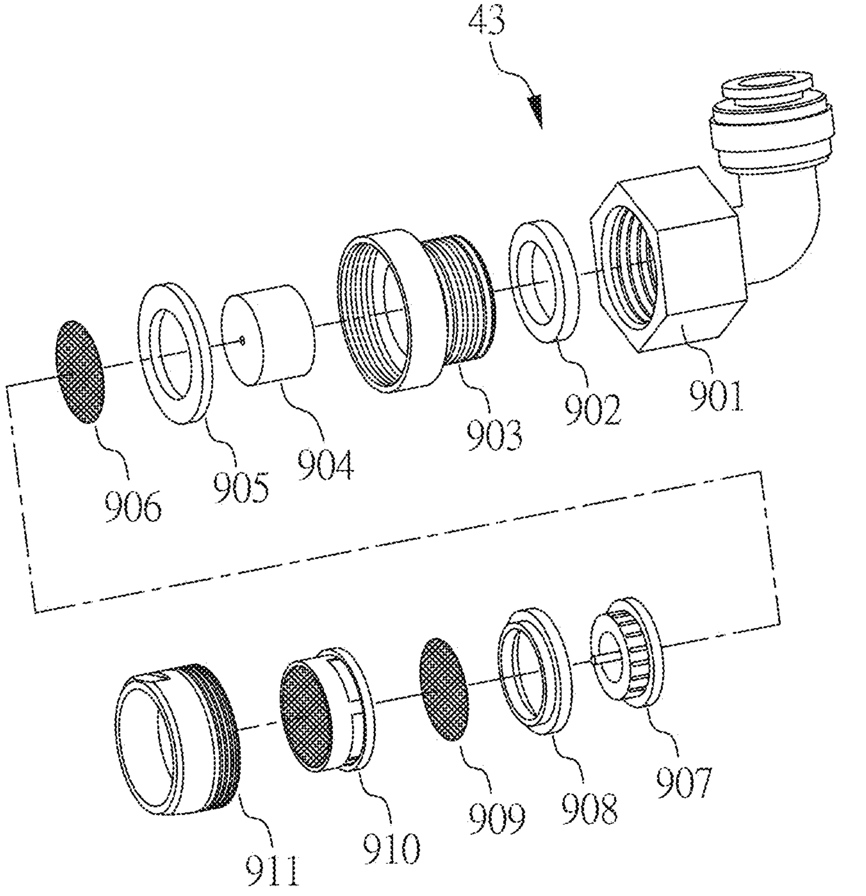
FIG. 10 is an exploded view of the nozzle according to one embodiment of the present invention.

The first air-liquid tank 41, the second air-liquid tank 42, and the nozzle 43 are connected in sequence and locate between the pump outlet port 10_OUT and the water outlet port W_OUT1. The "air-liquid tank" is also known as a "air-liquid mixer", which is a pressure tank that can push the gas (air) in the air-liquid tank into the liquid (water) with the thrust of the pump, sufficiently mix the gas (air) and the liquid (water), and therefore generate water containing a great amount of air, which is also knowns as "air-liquid-mixed water"; the structure and the principle of the air-liquid tank are illustrated in FIG. 9 and the relevant description. The nozzle 43 is used to generate fine bubbles from the air-liquid-mixed water; the structure and the principle of the nozzle are illustrated in FIG. 10 and the relevant description. Optionally or preferably, an auxiliary pipeline may be arranged as a branch between the second air-liquid tank 42 and the nozzle 43, and the auxiliary pipeline may include a third solenoid valve 44, and be connected to the accelerating water outlet port W_OUT2. The third solenoid valve 44 acts to open the auxiliary pipeline, so as to accelerate discharging the water in the first air-liquid tank 41 and the second air-liquid tank 42, and the air supplement function can therefore be speeded up, so as to avoid the exhaustion of air in the first air-liquid tank 41 and the second air-liquid tank 42 during the continuous operation of the pump 10.

It is noted that, at the side of the pump outlet port 10_OUT, the first embodiment further includes a first flow switch 45, arranged in a pipeline between the pump outlet port 10_OUT and the first air-liquid tank 41. The "flow switch" in the present description can detect and receive an operating state of the fine bubble generator system 1, for example, a state of water inflow in a pipeline, wherein the state of water inflow may refer to the water flow existence or no water flow existence.

The control module 50 includes a controller, which may be an electronic device, such as a control panel, a computer, a smartphone, capable of wired or wireless communication. The control module 50 may have an anti-toppling protecting mechanism, whereby when it is tilted beyond, for example, 30 degrees, the fine bubble generator system 1 will be forced to a shutdown. The control module 50 is electrically connected to the pump 10, and configured to control the pump 10 to operate. The control module 50 is also electrically connected to the air inlet module 20, in particular to the first solenoid valve 22, and configured to control the air inlet module 20 to let the air in from the air inlet port A_IN by controlling the first solenoid valve 22 to operate. Specifically, the fine bubble generator system 1 operates in a way that the air inlet module 20 lets the air in from the air inlet port A_IN during a first time interval, the water inlet module 30 lets the water in from the water inlet port W_IN during a second time interval, and the first time interval and the second time interval do not overlay.

The principle of the first embodiment is to let the air and the water be suctioned into pipelines by the operation of the pump 10 respectively during different time intervals. The advantage of doing so is that, it can precisely control the respective suctioned amounts of air and water. Furthermore, by opening the second solenoid valve 32 and closing the first solenoid valve 22, it is possible to open the water channel while closing the air channel simultaneously, and then the pump 10 can provide a self-priming function. In contrast, the prior art bubble generator uses the negative pressure come from the water flow to suction the air into the water, which means that, in the prior art bubble generator, the air and the water flow simultaneously, and as a result, it is not possible to precisely control the respective suctioned amounts of air and water, and accordingly it is not possible to generate fine bubbles efficiently.

In the case where the first embodiment further includes the third solenoid valve 44, the control module 50 is electrically connected to the third solenoid valve 44, and configured to control the third solenoid valve 44 to operate, such that the third solenoid valve 44 allows the auxiliary pipeline to be opened during an air inflow interval, so as to accelerate discharging the water in the air-liquid tank set. Furthermore, because the first embodiment includes the second solenoid valve 32, the control module 50 is further electrically connected to the second solenoid valve 32, and configured to control the second solenoid valve 32 to operate; and because the first embodiment includes the first flow switch 45, the control module 50 is further electrically connected to the first flow switch 45, and configured to receive an operating state of the fine bubble generator system 1 from the first flow switch 45.

The fine bubble generator system 1 may be powered by a ground fault circuit interrupter (GFCI) power line 51, the GFCI power line 51 may be plugged into, for example, a power socket on a wall, and the control module 50 is connected to the GFCI power line 51 via a transformer 52, but not limited thereto.

Optionally or preferably, if the water channel is arranged with the second solenoid valve 32 (for example, referring to the first to the third embodiments), it is possible to consider to integrate the “accelerating water outlet pipeline” which connects the accelerating water outlet port W_OUT2 to the water container 7 and the “water inlet pipeline” which connects the water container 7 to the water inlet port W_IN into a single pipeline. One integrating way may be implemented by using a three-way pipe 6, in particular illustrated in FIG. 11 and the relevant description. By using the three-way pipe 6, it is possible to integrate the “accelerating water outlet pipeline” and the “water inlet pipeline”, accordingly reduce the number of external pipelines, and facilitate the installation of the fine bubble generator system 1.

The operating way of the fine bubble generator system 1 in the first embodiment is illustrated as follows:

It is possible to preset the fine bubble generator system 1 to operate for, for example, 14 minutes 50 seconds (which may be adjusted depending on practical demand) and then stop.

The pump 10 turns on, and the second solenoid valve 32 is opened simultaneously, while the first solenoid valve 22 and the third solenoid valve 44 are closed, the self-priming function of the pump 10 begins to suction the water. After the pump 10 turns on, at first, the first flow switch 45 will detect the state of water inflow, and if no water flows in within, for example, 5 seconds (which may be adjusted depending on practical demand), the fine bubble generator system 1 will be forced to a shutdown. If water flows in, the water will go sequentially through the water inlet filter 31, the second solenoid valve 32, the pump 10, and the first flow switch 45, and is injected into the first air-liquid tank 41 and the second air-liquid tank 42, and is finally released by the nozzle 43; meanwhile, the third solenoid valve 44 remains closed.

After the pump 10 turns on for, for example, 2 minutes (which may be adjusted depending on practical demand), the automatic air supplement function should be turned on, because during the 2 minutes, the fine bubble generator system 1 continues the water inflow process, generates the fine bubbles, and consumes the amount of air contained in the water, so the air supplement function should be periodically performed. The automatic air supplement function is performed as follows: (a) The first solenoid valve 22 is opened to allow the air to enter from the first check valve 21, the air goes sequentially through the first solenoid valve 22, the pump 10, and the first flow switch 45, and is injected into the first air-liquid tank 41 and the second air-liquid tank 42. (b) The first solenoid valve 22 and the third solenoid valve 44 are opened simultaneously, so that the air supplement function can be performed simultaneously with the water discharging process accelerated; meanwhile, the second solenoid valve 32 should be turned off. (c) After the air supplement function is performed for, for example, 10 to 12 seconds (which may be adjusted depending on practical demand), the first solenoid valve 22 and the third solenoid valve 44 are closed simultaneously, and then the air supplement function stops. (d) It is noted that, when the automatic air supplement function is turned on, the detection function of the first flow switch 45 should be turned off (but the water flow can still pass through it).

It is noted that, the flow switch used in some embodiments of the present invention is applicable to detect water flow, but not applicable to detect air flow, and it probably makes a false detection when it is used to detect air flow. Therefore, in the modes involving any air inflow process such as “automatic air supplement function” and “automatic water discharging function”, in order to avoid the occurrence of false detection, the control module 50 is configured to ignore the detection function of the flow switches, or in other words, stop the detection function of the flow switches in these modes. However, as long as a suitable controller (or a suitable program therein) is introduced, all of the embodiments of the present invention may still use a flow switch capable of detecting both of water flow and air flow.

During the operation period, it is possible to repeat several times the procedure from the water inflow process, the fine bubble generating process, until the automatic air supplement function. After the fine bubble generator operates for the preset time interval, the automatic water discharging function may be turned on for, for example, 15 seconds (which may be adjusted depending on practical demand). The automatic water discharging function is performed as follows: (a) The pump 10 continues to operate. (b) The first solenoid valve 22 and the third solenoid valve 44 are opened simultaneously to accelerate the water discharging process, and meanwhile, the second solenoid valve 32 should be closed. (c) It is noted that, when the automatic water discharging function is turned on, the detection function of the first flow switch 45 should be turned off (but the water flow can still pass through it).

Second Embodiment

Figure 2:
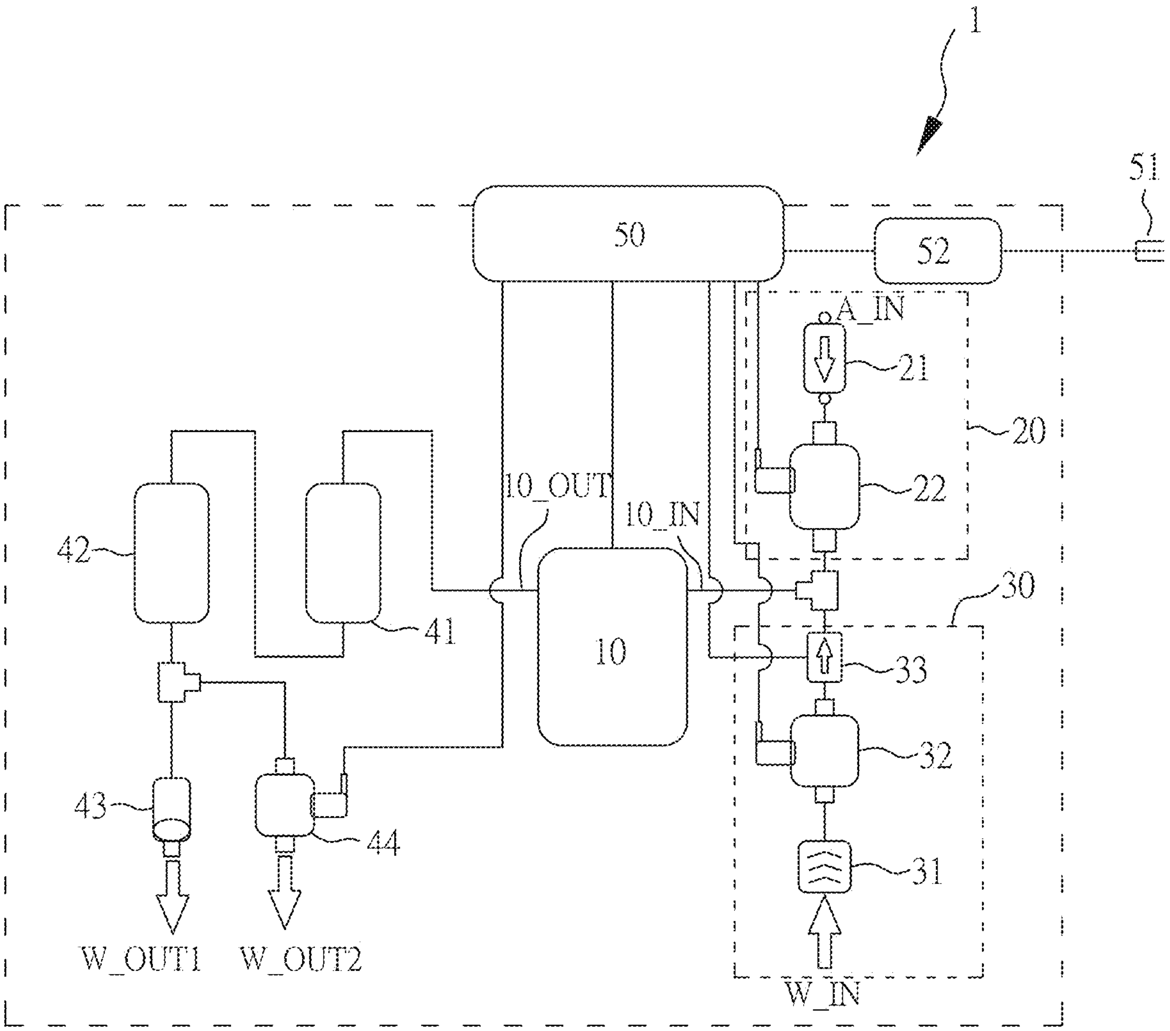
FIG. 2 is a systemic block diagram of the fine bubble generator system according to the second embodiment of the present invention.

FIG. 2 is a systemic block diagram of the fine bubble generator system 1 according to the second embodiment of the present invention. Comparing FIG. 2 with FIG. 1, it can be seen that, the second embodiment is different from the first embodiment in that, the water inlet module 30 in the second embodiment has a second flow switch 33, and at the side of the pump outlet port 10_OUT, there is no first flow switch 45. Except for the aforementioned description, the second embodiment is the same as the first embodiment in terms of the other components and structures.

Specifically, in the second embodiment, the water inlet module 30 includes a water inlet filter 31, a second solenoid valve 32, and a pipeline with the second flow switch 33 arranged therein connected in sequence between the water inlet port W_IN and the pump inlet port 10_IN. Accordingly, the control module 50 is electrically connected to the second flow switch 33, and configured to receive an operating state of the fine bubble generator system 1 from the second flow switch 33.

The fine bubble generator system 1 in the second embodiment has its operating principle and operating way similar to those in the first embodiment, so the details are omitted here.

Third Embodiment

Figure 3:
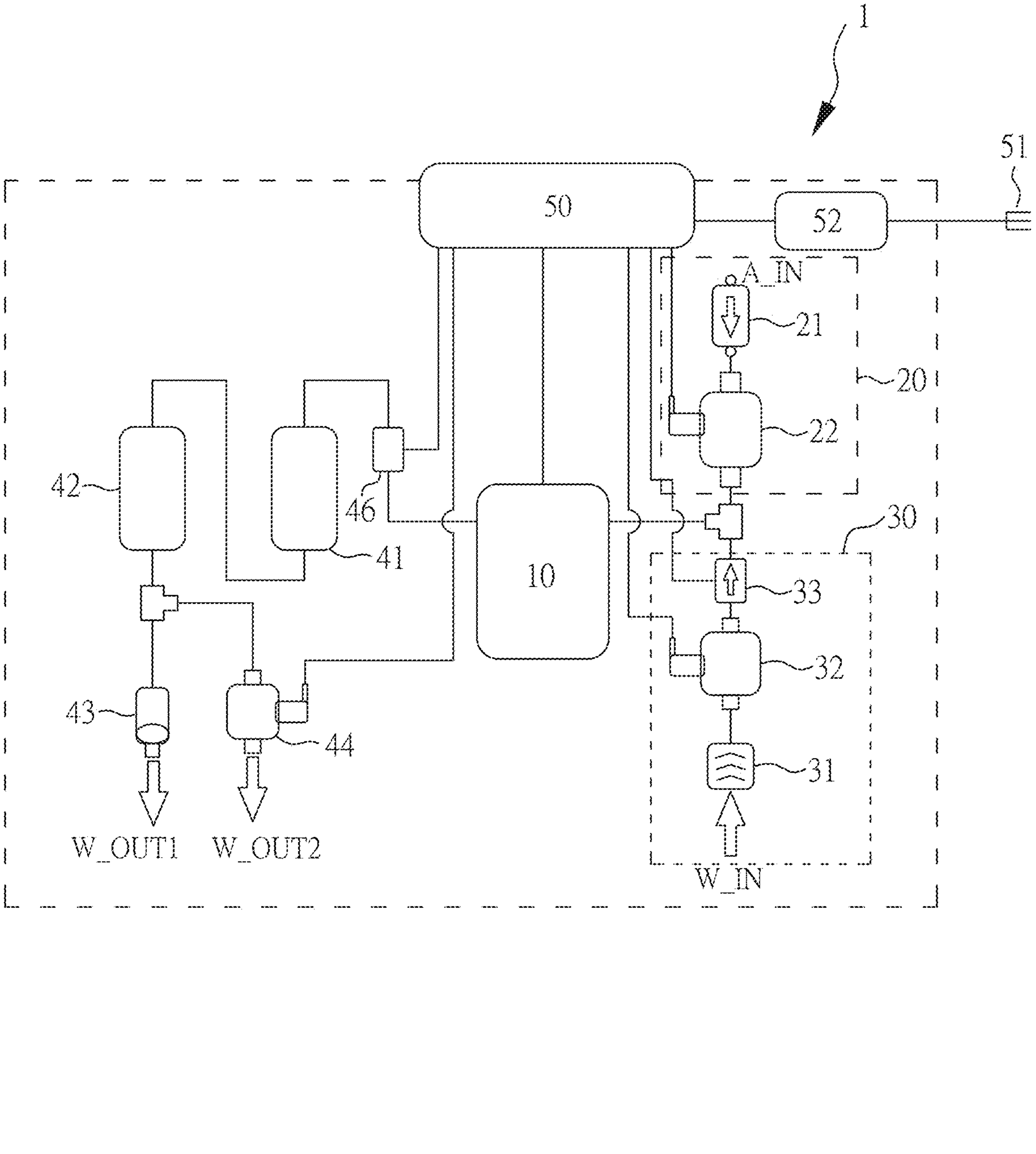
FIG. 3 is a systemic block diagram of the fine bubble generator system according to the third embodiment of the present invention.

FIG. 3 is a systemic block diagram of the fine bubble generator system 1 according to the third embodiment of the present invention. Comparing FIG. 3 with FIG. 1, it can be seen that, the third embodiment is different from the first embodiment in that, the water inlet module 30 in the third embodiment has a second flow switch 33, and at the side of the pump outlet port 10_OUT, the first flow switch 45 is replaced by a first water sensor 46. Except for the aforementioned description, the third embodiment is the same as the first embodiment in terms of the other components and structures.

Specifically, in the third embodiment, the water inlet module 30 includes a water inlet filter 31, a second solenoid valve 32, and a pipeline with the second flow switch 33 arranged therein connected in sequence between the water inlet port W_IN and the pump inlet port 10_IN. At the side of the pump outlet port 10_OUT, there is further included the first water sensor 46, arranged in another pipeline between the pump outlet port 10_OUT and the first air-liquid tank 41. The first water sensor 46 is a contact water sensor. Accordingly, the control module 50 is electrically connected to the second flow switch 33, and configured to receive an operating state of the fine bubble generator system 1 from the second flow switch 33. The control module 50 is also electrically connected to the first water sensor 46, and configured to receive another operating state (for determining whether water exists or not) of the fine bubble generator system 1 from the first water sensor 46.

Fourth Embodiment

Figure 4:
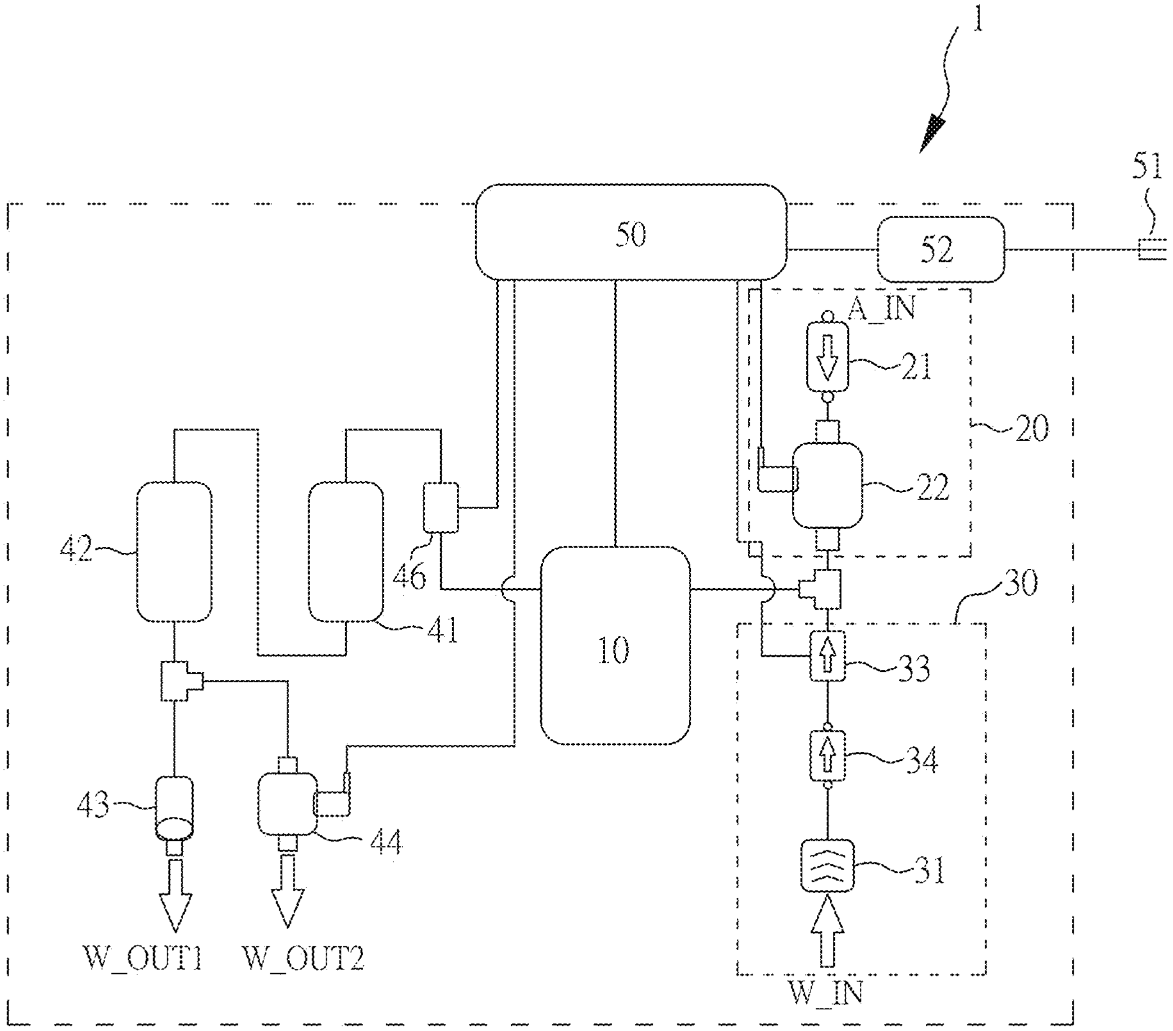
FIG. 4 is a systemic block diagram of the fine bubble generator system according to the fourth embodiment of the present invention.

FIG. 4 is a systemic block diagram of the fine bubble generator system 1 according to the fourth embodiment of the present invention. Comparing FIG. 4 with FIG. 1, it can be seen that, the fourth embodiment is different from the first embodiment in that, the water inlet module 30 in the fourth embodiment has a second flow switch 33, and the second solenoid valve 32 is replaced by a second check valve 34, and at the side of the pump outlet port 10_OUT, the first flow switch 45 is replaced by a first water sensor 46. Except for the aforementioned description, the fourth embodiment is the same as the first embodiment in terms of the other components and structures.

Specifically, in the fourth embodiment, the water inlet module 30 includes a water inlet filter 31, the second check valve 34, and a pipeline with the second flow switch 33 arranged therein connected in sequence between the water inlet port W_IN and the pump inlet port 10_IN. At the side the pump outlet port 10_OUT, there is further included the first water sensor 46, arranged in another pipeline between the pump outlet port 10_OUT and the first air-liquid tank 41. The first water sensor 46 is a contact water sensor. Accordingly, the control module 50 is electrically connected to the second flow switch 33, and configured to receive an operating state of the fine bubble generator system 1 from the second flow switch 33. The control module 50 is also electrically connected to the first water sensor 46, and configured to receive another operating state (for determining whether water exists or not) of the fine bubble generator system 1 from the first water sensor 46.

The principle of the fourth embodiment is that, when the first solenoid valve 22 is opened during the operation of the pump 10, and then the air is suctioned into the pump 10 through the first check valve 21 and the first solenoid valve 22; meanwhile, because the pump inlet port 10_IN is connected to the atmosphere, the pressure at the pump inlet port 10_IN is equal to the atmospheric pressure, so the water in the water channel arranged with the second check valve 34 can be blocked by the atmosphere, and therefore the water cannot be suctioned into the pump 10. When the first solenoid valve 22 is closed during the operation of the pump 10, the air is blocked by the first solenoid valve 22, while the water in the water channel is no more blocked by the atmosphere, and the water can be suctioned into the pump 10 through the second check valve 34 and the second flow switch 33. In other words, in the fourth embodiment, it can be understood that, the first solenoid valve controlling the air channel is indirectly controlling the water inflow operation in the water channel.

In those embodiments (for example, the fourth to the seventh embodiments of the present invention) where the water inlet module 30 lacks a solenoid valve or any other similar controllable component used to open or close the water channel, the aforementioned principle is applied to indirectly control the water inflow operation in the water channel.

On the other hands, during the air inflow interval, the effect of the second check valve 34 should be taken into consideration. When the fine bubble generator system 1 is installed in a position lower than the water level of the water container (for example, the bathtub), in the case where there is no second check valve 34, because the water level of the water container is higher than the fine bubble generator system 1, the water in the water container will flow toward the fine bubble generator system 1, and this is called the "siphon phenomenon", which may result in incorrect operation of the fine bubble generator system 1; however, in the case where there is the second check valve 34, the internal structure of the second check valve 34 can provide sufficient resistance to block the water in the water container (for example, the bathtub) to flow toward the fine bubble generator system 1 as a result of the siphon phenomenon.

The operating way of the fine bubble generator system 1 in the fourth embodiment is illustrated as follows:

It is possible to preset the fine bubble generator system 1 to operate, for example, 14 minutes 50 seconds (which may be adjusted depending on practical demand) and then stop.

The pump 10 turns on, and the first solenoid valve 22 is closed, the self-priming function of the pump 10 begins to suction the water. After the pump 10 turns on, at first, the second flow switch 33 will detect the state of water inflow, if no water flows in within, for example, 3 seconds (which may be adjusted depending on practical demand), the fine bubble generator system 1 will be forced to a shutdown. If water flows in, the water will go sequentially through the water inlet filter 31, the second check valve 34, the second flow switch 33, the pump 10, and the first water sensor 46, and is injected into the first air-liquid tank 41 and the second air-liquid tank 42, and is finally released by the nozzle 43; meanwhile, the third solenoid valve 44 remains closed.

After the pump 10 turns on for, for example, 2 minutes and 30 seconds (which may be adjusted depending on practical demand), the automatic air supplement function should be turned on. The automatic air supplement function is performed as follows: First of all, when the automatic air supplement function is turned on, a state of no water existence in the pipelines should be confirmed by the detection of the first water sensor 46; if it detects a state of water existence, an error warning should be issued, and the fine bubble generator system 1 should be forced to a shutdown. Next, (a) The pump 10 continues to operate. (b) The first solenoid valve 22 is opened to allow the air to enter from the first check valve 34, the air goes sequentially through the first solenoid valve 22, the pump 10, and the first water sensor 46, and is injected into the first air-liquid tank 41 and the second air-liquid tank 42. (c) The first solenoid valve 22 and the third solenoid valve 44 are opened simultaneously, so that the air supplement function can be performed simultaneously with the water discharging process accelerated. (d) After the air supplement function is performed for, for example, 8 seconds (which may be adjusted depending on practical demand), the first solenoid valve 22 and the third solenoid valve 44 are closed simultaneously. (e) It is noted that, when the automatic air supplement function is turned on, the detection function of the second flow switch 33 should be turned off (but the water flow can still pass through it).

During the operation period, it is possible to repeat several times the procedure from the water inflow process, the fine bubble generating process, until the automatic air supplement function. After the fine bubble generator operates for the preset time interval, the automatic water discharging function may be turned on for, for example, 10 seconds (which may be adjusted depending on practical demand). The automatic water discharging function is performed as follows: (a) The pump 10 continues to operate. (b) The first solenoid valve 22 and the third solenoid valve 44 are opened simultaneously to accelerate the water discharging process. (c) It is noted that, when the automatic water discharging function is turned on, the detection function of the second flow switch 33 should be turned off (but the water flow can still pass through it), and the detection function of the first water sensor 46 should be turned on to confirm a state of no water existence in the pipelines.

Fifth Embodiment

Figure 5:
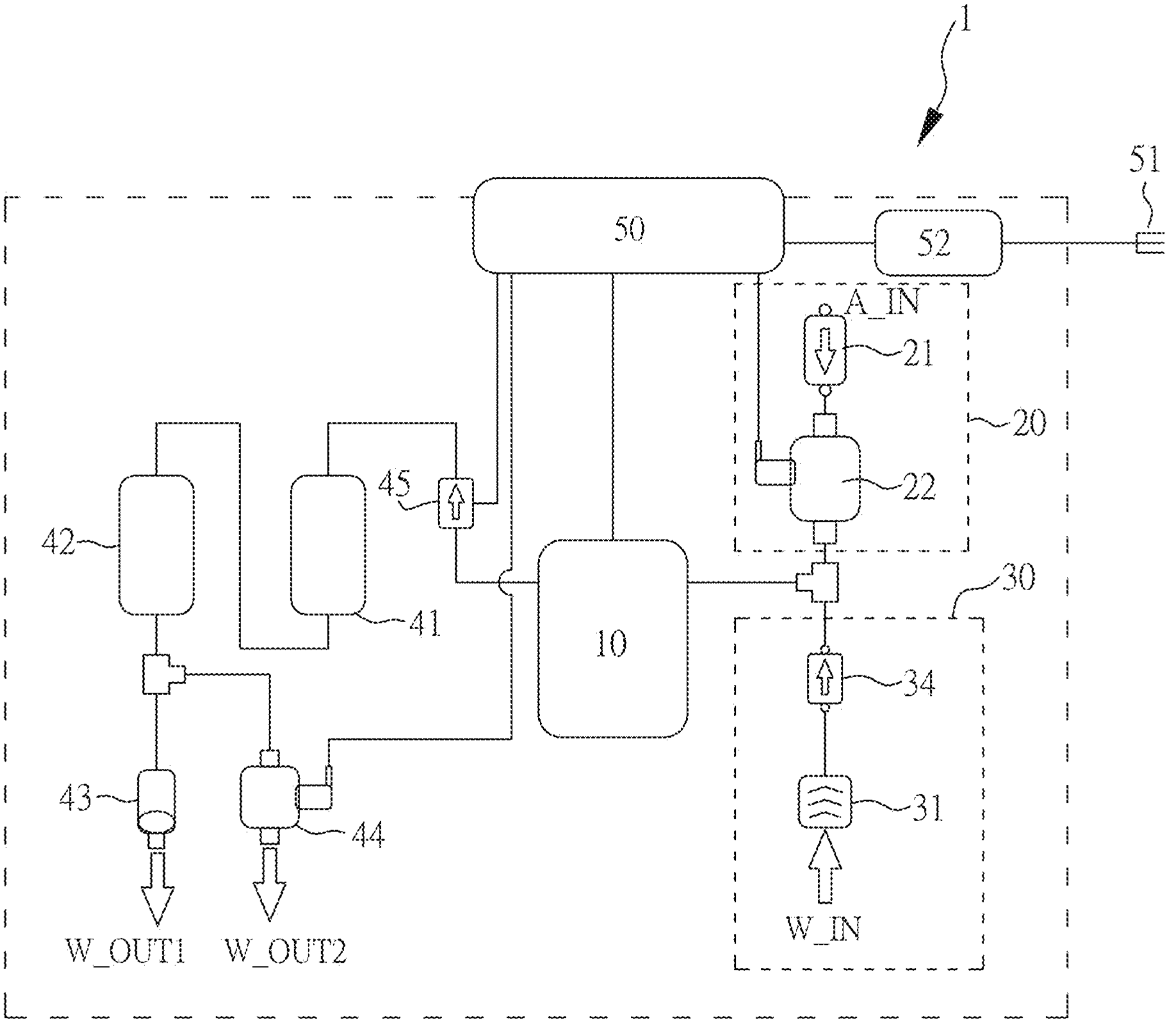
FIG. 5 is a systemic block diagram of the fine bubble generator system according to the fifth embodiment of the present invention.

FIG. 5 is a systemic block diagram of the fine bubble generator system 1 according to the fifth embodiment of the present invention. Comparing FIG. 5 with FIG. 1, it can be seen that, the fifth embodiment is different from the first embodiment in that, in the water inlet module 30 in the fifth embodiment, the second solenoid valve 32 is replaced by a second check valve 34. Except for the aforementioned description, the fifth embodiment is the same as the first embodiment in terms of the other components and structures.

Specifically, in the fifth embodiment, the water inlet module 30 includes a water inlet filter 31 and the second check valve 34 connected in sequence between the water inlet port W_IN and the pump inlet port 10_IN.

Sixth Embodiment

Figure 6:
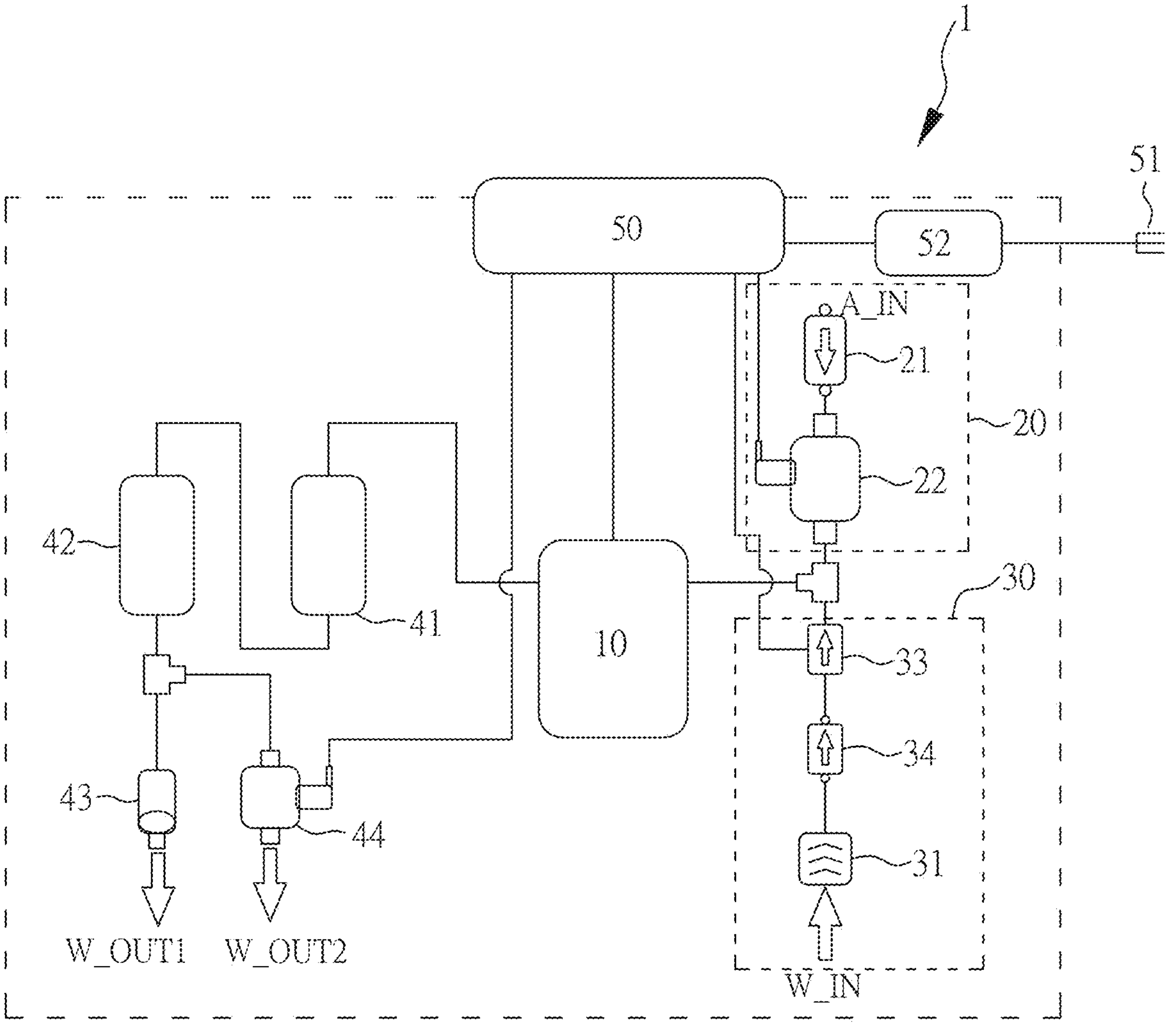
FIG. 6 is a systemic block diagram of the fine bubble generator system according to the sixth embodiment of the present invention.

FIG. 6 is a systemic block diagram of the fine bubble generator system 1 according to the sixth embodiment of the present invention. Comparing FIG. 6 with FIG. 1, it can be seen that, the sixth embodiment is different from the first embodiment in that, the water inlet module 30 in the sixth embodiment has a second flow switch 33, and the second solenoid valve 32 is replaced by a second check valve 34, and at the side of the pump outlet port 10_OUT, there is no first flow switch 45. Except for the aforementioned description, the sixth embodiment is the same as the first embodiment in terms of the other components and structures.

Specifically, in the sixth embodiment, the water inlet module 30 includes a water inlet filter 31, the second check valve 34, and a pipeline with the second flow switch 33 arranged therein connected in sequence between the water inlet port W_IN and the pump inlet port 10_IN. Accordingly, the control module 50 is electrically connected to the second flow switch 33, and configured to receive an operating state of the fine bubble generator system 1 from the second flow switch 33.

Seventh Embodiment

Figure 7:
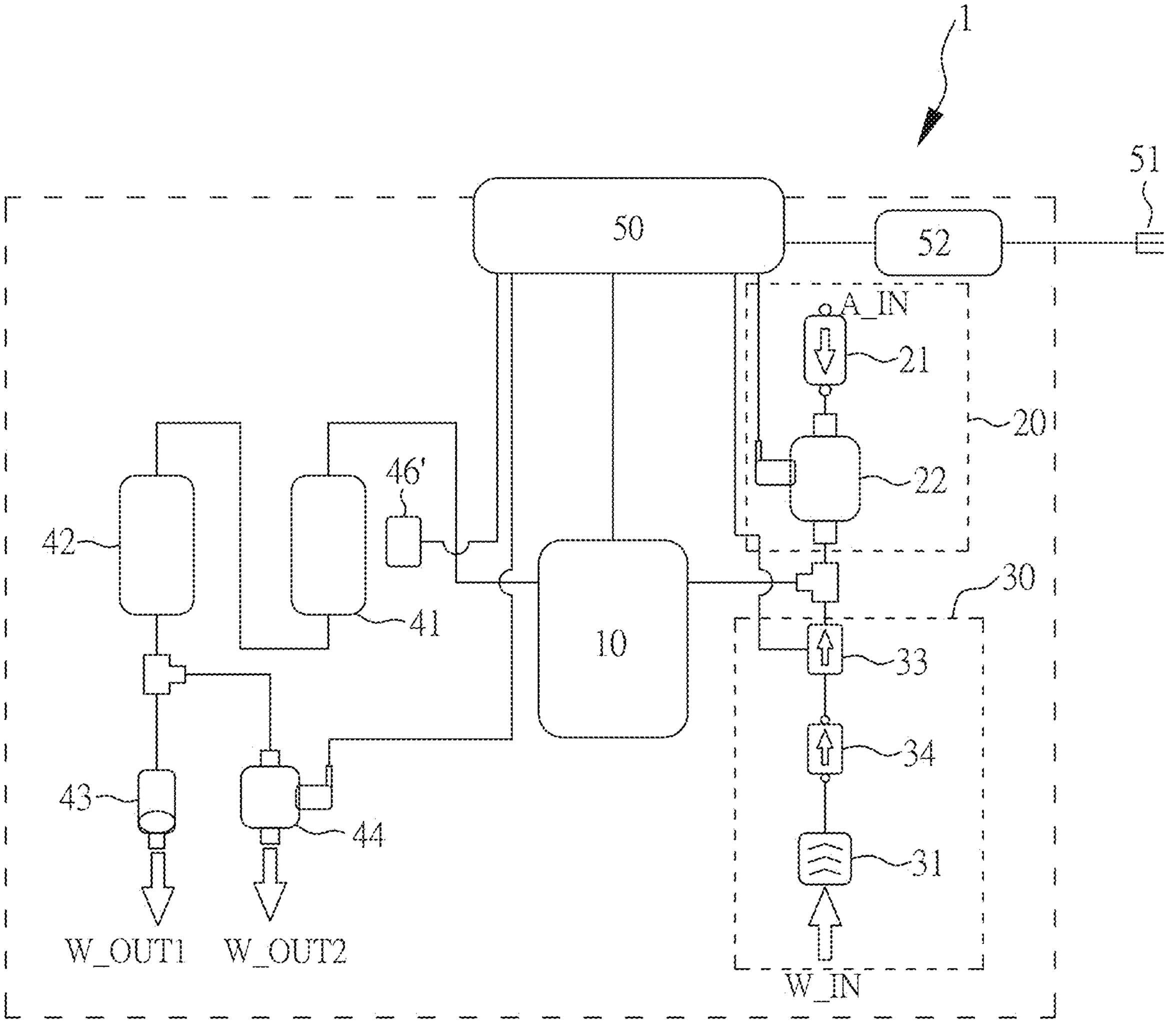
FIG. 7 is a systemic block diagram of the fine bubble generator system according to the seventh embodiment of the present invention.

FIG. 7 is a systemic block diagram of the fine bubble generator system 1 according to the seventh embodiment of the present invention. Comparing FIG. 7 with FIG. 1, it can be seen that, the seventh embodiment is different from the first embodiment in that, the water inlet module 30 in the seventh embodiment has a second flow switch 33, and the second solenoid valve 32 is replaced by a second check valve 34, and at the side of the pump outlet port 10_OUT, the first flow switch 45 is replaced by a second water sensor 46' being a non-contact water sensor. Except for the aforementioned description, the seventh embodiment is the same as the first embodiment in terms of the other components and structures.

Specifically, in the seventh embodiment, the water inlet module 30 includes a water inlet filter 31, the second check valve 34, and a pipeline with the second flow switch 33 arranged therein connected in sequence between the water inlet port W_IN and the pump inlet port 10_IN. At the side of the pump outlet port 10_OUT, there is further included the second water sensor 46', adjacent to the pump outlet port 10_OUT or the first air-liquid tank 41. The second water sensor 46' is a non-contact water sensor. Accordingly, the control module 50 is electrically connected to the second flow switch 33, and configured to receive an operating state of the fine bubble generator system 1 from the second flow switch 33. The control module 50 is also electrically connected to the second water sensor 46', and configured to receive another operating state (for determining whether water exists or not) of the fine bubble generator system 1 from the second water sensor 46'.

The fine bubble generator system 1 in the seventh embodiment has its operating principle and operating way similar to those in the fourth embodiment, so its detailed description is omitted here.

Application Example

FIG. 8 is a schematic diagram showing the connection between the fine bubble generator system 1 and the water container 8 according to one application example of the present invention. In this example, the water container 8 is a bathtub, but it may also be a footbath, a vegetable basin, a sink, a small pool (for example, an inflatable pool), or the like. The fine bubble generator system 1 of the present invention has an air inlet port A_IN (not shown) connected to the atmosphere, and a water inlet port W_IN, a water outlet port W_OUT1, and an optional accelerating water outlet port W_OUT2 which are put into the water container 8. The fine bubble generator system 1 in the application example illustrated by FIG. 8 may be the fine bubble generator system 1 or its variation in the first to the seventh embodiments as previously mentioned.

(Air-Liquid Tank)

FIG. 9 is an exploded view of the air-liquid tank according to one embodiment of the present invention.

As shown in FIG. 9, the air-liquid tank sequentially includes an air-liquid tank upper cover 801, a water impact baffle 802, a large-and-small-bubble separator 803, a separator retaining ring 804, and an air-liquid tank lower cover 805. The aforementioned components can be assembled referring to FIG. 9, so the details are omitted here.

The air-liquid tank is designed according to the following requirements:

(1) More impact and cutting actions should be applied on the water flow entering into the air-liquid tank, so as to improve the mixing of air and water. For this purpose, after the water flow enters the air-liquid tank upper cover 801 and hits the water impact baffle 802, the water impact baffle 802 having a special structure can splash the water flow and apply the cutting action on the water flow. Doing so can improve the mixing of air and water.

(2) Large and small bubbles should be separated. Specifically, when the air and the water are mixed in the air-liquid tank, bubbles of different sizes can be generated. For this purpose, the large-and-small-bubble separator 803 is arranged in the air-liquid tank, and the large-and-small-bubble separator 803 has several small holes, which can block the bubbles of large size. Furthermore, the large-and-small-bubble separator 803 can have the air to stay in the air-liquid tank for a longer time, and thereby reduce the number of times of air supplement function.

(Nozzle)

FIG. 10 is an exploded view of the nozzle 43 according to one embodiment of the present invention.

The nozzle 43 is a component that can generate fine bubbles from the air-liquid-mixed water, and the nozzle 43 sequentially includes a nozzle nut 901, a first waterproof gasket 902, a transfer connector 903, a water column generating component 904, a second waterproof gasket 905, a first metal mesh 906, a first water separator 907, a second water separator 908, a second metal mesh 909, a third water separator 910, and a nozzle metal shell 911.

Next, the aforementioned components can be assembled referring to FIG. 10. The water column generating component 904 is placed in the transfer connector 903, wherein the transfer connector 903 is the entrance of the air-liquid-mixed water, that is, connected to the exit of the second air-liquid tank 42, and a water column will be sprayed from the small hole of the water column generating component 904. The first water separator 907 is placed in front of the water column generating component 904, the water column sprayed from the small hole of the water column generating component 904 will hits at the center of the first water separator 907 through the first metal mesh 906. The first water separator 907, the second water separator 908, and the second metal mesh 909 overlap and are placed in the third water separator 910, and the third water separator 910 is then placed in the nozzle metal shell 911. The first waterproof gasket 902 is placed in the nozzle nut 901, and the transfer connector 903 is then locked on the nozzle nut 901. The water column generating component 904, the second waterproof gasket 905, and the first metal mesh 906 are placed in sequence in the transfer connector 903, and the nozzle metal shell 911 is then locked to the transfer connector 903.

The principle about how the nozzle 9 generates fine bubbles is illustrated as follows: With the water column generating component 904 connected to the transfer connector 903, the air-liquid-mixed water passing through the small holes having a reduced diameter of the water column generating component 904 can have an increased flow speed and thus form a strong water column. The water column is cut by the first metal mesh 906 and hits at the center of the first water separator 907, which can provide splashing and stirring effects. The water column is broken up by the first water separator 907 and is injected into the air chamber formed by the first water separator 907, the second water separator 908, and the third water separator 910 (wherein, the second water separator 908 can seal its periphery, such that the air chamber has a suitable space), and it will experience the impact and cutting actions in the air chamber, in particular the further cutting action due to the second metal mesh 909 in the air chamber, and finally the fine bubbles are generated.

(Optional and Preferable Functions)

Various optional and preferable functions applicable in the fine bubble generator system of the present invention, which may be chosen by the skilled person depending on practical demand, are described as follows.

(Three-Way Pipe)

Figure 11:
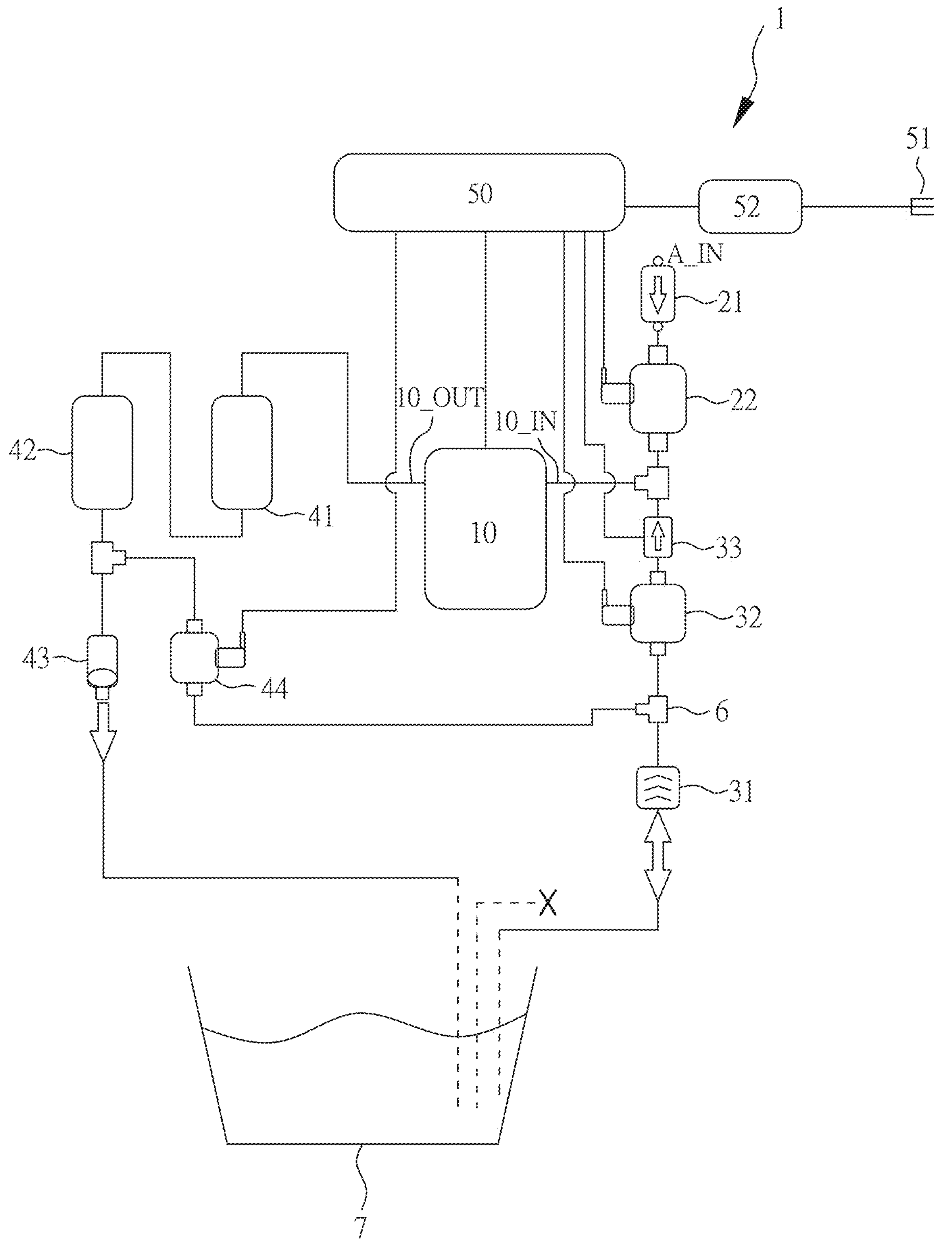
FIG. 11 is a schematic diagram showing the connection between the water container and the fine bubble generator system in the second embodiment of the present invention when using a three-way pipe.

FIG. 11 is a schematic diagram showing the connection between the water container and the fine bubble generator system in the second embodiment of the present invention when using a three-way pipe.

As previously mentioned, if the water channel is arranged with the second solenoid valve 32 (for example, referring to the first to the third embodiments), it is possible to consider to integrate the "accelerating water outlet pipeline" which connects the accelerating water outlet port W_OUT2 to the water container 7 and the "water inlet pipeline" which connects the water container 7 to the water inlet port W_IN into a single pipeline. One integrating way may be implemented by using a three-way pipe 6. FIG. 11 is illustrated based on the second embodiment. As shown in FIG. 11, the three-way pipe 6 has a first port, a second port, and a third port. Typically, the three-way pipe 6 is of T-shape, but may also be of any other shape. The first port is connected to the outlet port of the water inlet filter 31, the second port is connected to the inlet port of the second solenoid valve 32, and the third port is connected to the accelerating water outlet port W_OUT2. Originally, the water inlet port W_IN needs an external pipeline for water inflow from the water container 7, and the accelerating water outlet port W_OUT2 needs another external pipeline for water outflow into the water container 7, so here it needs two external pipelines. However, by using the three-way pipe 6, it is possible to integrate the "accelerating water outlet pipeline" and the "water inlet pipeline", accordingly reduce the number of external pipelines, and facilitate the installation of the fine bubble generator system 1.

(Flow Switch and Water Sensor)

The purpose and the operating way of the "flow switch" and the "water sensor" are illustrated as follows. The flow switch is used to detect whether there is fluid flowing in a pipeline. The water sensor may be a contact water sensor or a non-contact water sensor, which are both used to detect whether water exists in the pipeline or not.

During the water inflow interval: (a) When the flow switch detects that there is water flowing, and the water sensor detects the water existence, the control module can determine a normal operating state of the fine bubble generator system. (b) When the flow switch detects that there is something flowing (actually, air flowing), and the water sensor detects no water existence, the control module can determine an abnormal operating state of the fine bubble generator system, wherein this situation means that the water inlet port is suctioning the air, probably because the water inlet port has left from the water surface. (c) When the flow switch detects that there is nothing flowing, and the water sensor detects the water existence, the control module can determine an abnormal operating state of the fine bubble generator system, wherein this situation means that a problem occurs in the water inlet module, probably because the flow switch malfunctions and cannot detect the water flowing. (d) When the flow switch detects that there is nothing flowing, and the water sensor detects no water existence, the control module can determine an abnormal operating state of the fine bubble generator system, wherein this situation means that a problem occurs in the water inlet module, probably because the water inlet module has an obstruction, for example, the water inlet filter has a jam.

During the air inflow interval, (a) When the flow switch detects that there is something flowing (actually, air flowing), and the water sensor detects no water existence, the control module can determine a normal operating state of the fine bubble generator system. (b) When the flow switch detects that there is something flowing (actually, air flowing), and the water sensor detects the water existence, the control module can determine an abnormal operating state of the fine bubble generator system, wherein this situation means that the water sensor malfunctions and makes a false detection of water existence. (c) When the flow switch detects that there is something flowing (actually, water flowing), and the water sensor detects no water existence, the control module can determine an abnormal operating state of the fine bubble generator system, wherein this situation means that the flow switch malfunctions and makes a false detection of water flowing. (d) When the flow switch detects that there is something flowing (actually, water flowing), and the water sensor detects the water existence, the control module can determine an abnormal operating state of the fine bubble generator system, wherein this situation means that the air inlet module has an obstruction, or the second check valve malfunctions, or the first solenoid valve malfunctions.

(Automatic Forcible Water Discharging)

Optionally and preferably, after using the fine bubble generator system and before turning off it, it is preferably to perform an automatic forcible water discharging to completely discharge the water in all of the water-related devices such as the pipelines, the pump, the air-liquid tank, the nozzle, so as to avoid the mold growing in the internal of the fine bubble generator system, which can influence the user's health. Furthermore, optionally and preferably, a blower may be arranged at the water inlet port of the fine bubble generator system. After the completion of the automatic forcible water discharging, the blower may be turned on to dry the water-related devices.

(Forcible Shutdown)

When the control module finds out any abnormality (for example, a jam) in the pipelines, component failure, or deviation (for example, excessive tilt) from the correct position where the fine bubble generator system should be, based on the detections by various detection devices (for example, a flow switch, a water sensor, or a tilt sensor), the control module may immediately turn off the power supplied to all of the loads (for example, the pump and the solenoid valves), force the pump to stop its operation, and force the solenoid valves to be closed. For this purpose, in the present invention, each solenoid valve can be of a normally closed configuration or a normally open configuration, which may be chosen by the skilled person depending on practical demand.

Although the present invention has been explained in relation to its preferred embodiment, it is to be understood that many other possible modifications and variations can be made without departing from the spirit and scope of the invention as hereinafter claimed.

What is claimed is:

1. A fine bubble generator system, which has an air inlet port, a water inlet port, and a water outlet port, and comprising:

a pump, having a pump inlet port and a pump outlet port;

an air inlet module, connected between the air inlet port and the pump inlet port;

a water inlet module, connected between the water inlet port and the pump inlet port;

a first air-liquid tank and/or a second air-liquid tank, and a nozzle connected in sequence between the pump outlet port and the water outlet port; and a control module, electrically connected to the pump and the air inlet module, and configured to control the pump to operate, and control the air inlet module to let air in from the air inlet port;

wherein an auxiliary pipeline is arranged as a branch between the second air-liquid tank and the nozzle, the auxiliary pipeline includes a third solenoid valve, and is connected to an accelerating water outlet port; the control module is electrically connected to the third solenoid valve, and configured to control the third solenoid valve to operate.

2. The fine bubble generator system of claim 1, wherein the air inlet module lets air in from the air inlet port during a first time interval, the water inlet module lets water in from the water inlet port during a second time interval, and the first time interval and the second time interval do not overlap.

3. The fine bubble generator system of claim 1, wherein the air inlet module includes a first check valve and a first solenoid valve connected in sequence between the air inlet port and the pump inlet port; the control module is electrically connected to the first solenoid valve, and configured to control of the first solenoid valve to operate.

4. The fine bubble generator system of claim 1, wherein the third solenoid valve is configured to allow the auxiliary pipeline to be opened during an air inflow interval, so as to accelerate discharging water in the first air-liquid tank and/or the second air-liquid tank.

5. The fine bubble generator system of claim 1, wherein the water inlet module includes a water inlet filter and a second solenoid valve connected in sequence between the water inlet port and the pump inlet port; the control module is electrically connected to the second solenoid valve, and configured to control the second solenoid valve to operate;

the fine bubble generator system further includes a first flow switch, arranged in a pipeline between the pump outlet port and the first air-liquid tank; the control module is electrically connected to the first flow switch, and configured to receive an operating state of the fine bubble generator system from the first flow switch.

6. The fine bubble generator system of claim 1, wherein the water inlet module includes a water inlet filter, a second solenoid valve, and a pipeline with a second flow switch arranged therein connected in sequence between the water inlet port and the pump inlet port; the control module is electrically connected to the second solenoid valve, and configured to control the second solenoid valve to operate; the control module is electrically connected to the second flow switch, and configured to receive an operating state of the fine bubble generator system from the second flow switch.

7. The fine bubble generator system of claim 6, further comprising a first water sensor, arranged in another pipeline between the pump outlet port and the first air-liquid tank, wherein the first water sensor is a contact water sensor; the control module is electrically connected to the first water sensor, and configured to receive an operating state of the fine bubble generator system from the first water sensor.

8. The fine bubble generator system of any one of claims 5 to 7, further comprising a three-way pipe, which has a first port connected to an outlet port of the water inlet filter, a second port connected to an inlet port of the second solenoid valve, and a third port connected to the accelerating water outlet port.

9. The fine bubble generator system of claim 1, wherein the water inlet module includes a water inlet filter, a second check valve, and a pipeline with a second flow switch arranged therein connected in sequence between the water inlet port and the pump inlet port; the control module is electrically connected to the second flow switch, and configured to receive an operating state of the fine bubble generator system from the second flow switch.

10. The fine bubble generator system of claim 9, further comprising a first water sensor, arranged in another pipeline between the pump outlet port and the first air-liquid tank, wherein the first water sensor is a contact water sensor; the control module is electrically connected to the first water sensor, and configured to receive an operating state of the fine bubble generator system from the first water sensor.

11. The fine bubble generator system of claim 9, further comprising a second water sensor, adjacent to the pump outlet port or the first air-liquid tank, wherein the second water sensor is a non-contact water sensor; the control module is electrically connected to the second water sensor, and configured to receive an operating state of the fine bubble generator system from the second water sensor.

12. The fine bubble generator system of claim 1, wherein the water inlet module includes a water inlet filter and a second check valve connected in sequence between the water inlet port and the pump inlet port;

the fine bubble generator system further includes a first flow switch, arranged in a pipeline between the pump outlet port and the first air-liquid tank; the control module is electrically connected to the first flow switch, and configured to receive an operating state of the fine bubble generator system from the first flow switch.

13. The fine bubble generator system of claim 1, wherein the fine bubble generator system is powered by a ground fault circuit interrupter (GFCI) power line; the control module is connected to the GFCI power line via a transformer; the control module includes a control panel.

* * * * *